Feb. 7, 1956
H. P. BLAY
2,733,526
HORN RING STRUCTURE
Filed Jan. 3, 1952
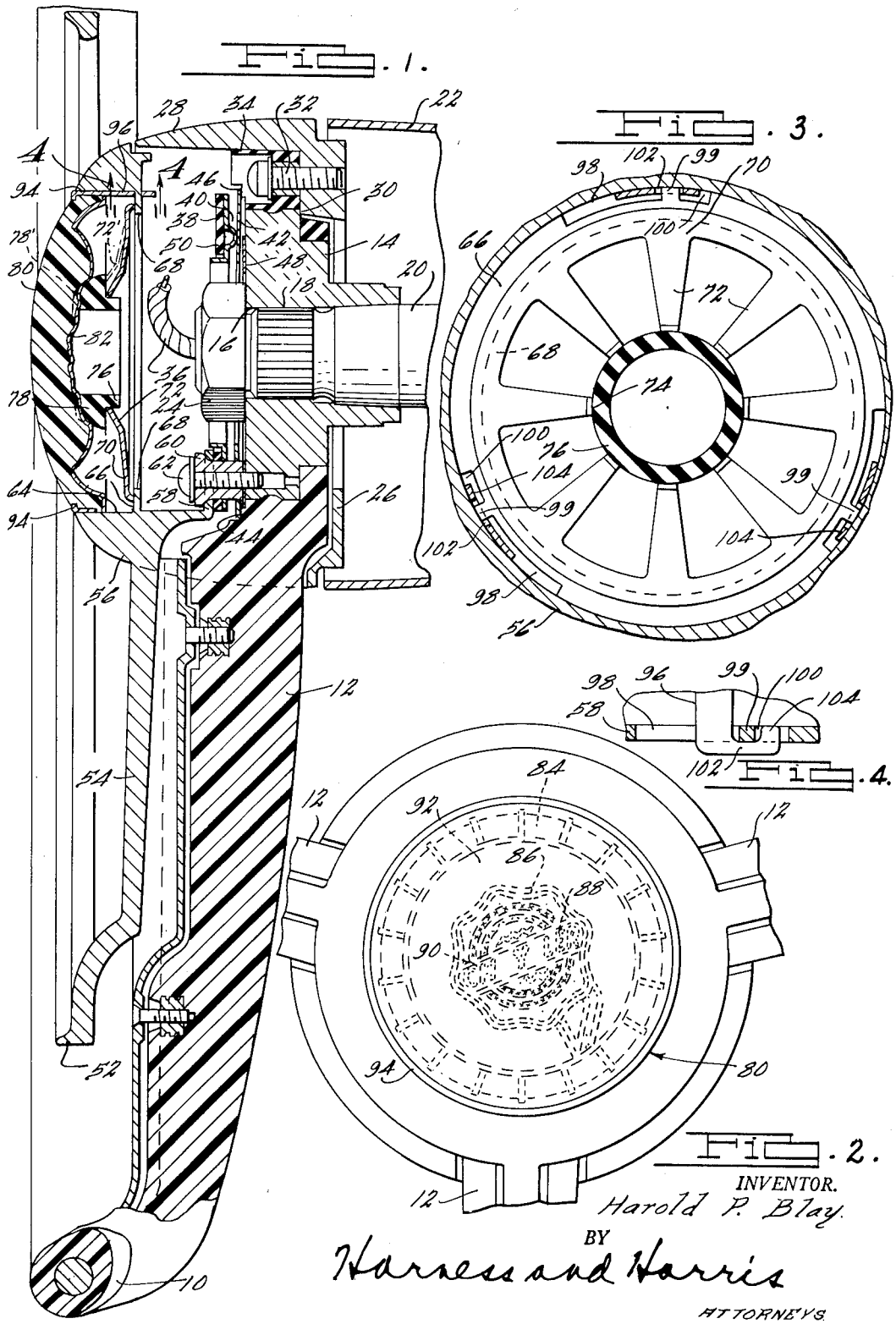
INVENTOR.
Harold P. Blay
BY
Harness and Harris
ATTORNEYS.

United States Patent Office 2,733,526
Patented Feb. 7, 1956

2,733,526

HORN RING STRUCTURE

Harold P. Blay, Detroit, Mich., assignor to Chrysler Corporation, Highland Park, Mich., a corporation of Delaware Application January 3, 1952, Serial No. 264,780

4 Claims. (Cl. 40—8)

This application relates to a detachable fastening means for holding together two yieldably opposed members, and particularly relates to the retainer device effective between a steering wheel horn ring and the hub cover ornament which is yieldably retained therein.

Present day transparent plastics show such favorable characteristics with respect to resisting the discoloring effects of weathering and aging that they are finding increased usage for many ornamental and medallion purposes for which metals were formerly used to a large extent. By a familiar process, a piece of transparent plastic, according to wide usage, is formed so as to have an intaglio design in its under side which when covered with colored pigments or metallic-like materials or metals and viewed from the opposite clear side of the piece, gives the appearance of a metallic embossment which is particularly suited to use as the medallion serving, for instance, as the hub cover ornament for automotive steering wheels. The underside of such an ornament ordinarily has only a very thin deposit of the pigments or metals used to provide the coloring, and even when a protective coat is superposed over the various layers and patches of color, the resulting surface is still relatively destructible and easily marked as by scratches which can mar and detract from the finished embossed-like appearance created in the plastic. According to a feature of the present invention, a bezel-retained transparent hub cover ornament is provided having a yieldable supporting part engaging the colored intaglio-like underside thereof in a manner positively to apply pressure thereto yet without danger of scuffing off the pigment or metal on the intaglio-like under surface.

An object of the invention is to provide a detachably fastened retaining bezel for a hub cover ornament carried by the horn ring in a steering wheel assembly, in which the ornament is yieldably supported in the horn ring hub so as to maintain the retaining bezel under positive stress at all times.

Another object is to provide an ornamentally covered horn ring for vehicle steering wheels in which the cover, while capable of ready removal, is at the same time held firmly enough in place to prevent rattling or inadvertent dislodgment of the cover.

According to another feature of the invention, provision is made for centrally supporting an ornament cover in the hub of a horn ring in a manner such that support pressure is applied directly to the central region of the underside of the ornament thus preserving a concentric type loading arrangement free from any tendency of effecting off center loads; moreover, the pressure just noted is so applied over a substantial region of such under surface that it may be evenly distributed rather than localized.

According to another feature of the invention, a spring-held hub cover ornament is provided for reception in the hub of a vehicle horn ring in which a flat spring can be used to hold the ornament in supported relationship, thereby permitting a flat compact installation in the horn ring.

Further features, objects, and advantages will either be specifically pointed out or become apparent when for a better understanding of the invention reference is made to the following written description taken in conjunction with the accompanying drawing in which:

Figure 1 is an elevation in section of a vehicle steering wheel to which the invention is shown applied;

Figure 2 is a top plan view of the vehicle steering wheel;

Figure 3 is a top plan view of a spring contained in the steering wheel assembly of Figure 1; and Figure 4 is a section taken along lines 4—4 in Figure 1.

In the drawing, a three-spoke steering wheel 10 is shown which represents one of the general types of wheels conventionally used for the steering gear of motor vehicles. The steering wheel 10 has a set of spokes 12 which extend inwardly to a common hub 14. The steering wheel hub 14 has a central opening 16 and sets of splines 18 therein which cooperate to form a splined connection between the hub 14 and a hollow steering tube 20 received in the central opening 16 of the former. The steering tube 20 is journalled for rotation in a steering column structure which includes a steering column jacket 22 of general cylindrical shape. The upper end of the steering tube 20 is threaded so as to receive a nut 24 which fastens the steering wheel hub 14 and the steering tube 20 securely together. A decorative element 26 is provided which has one or more circumferentially related shroud-like portions 28 and which engages the under side 30 of the steering wheel hub 14. The shroud-providing element 26 is held securely engaged to the hub 14 by means of one or more screw fasteners 32 which are received in a like number of insulators 34 carried by the hub and steering wheel assembly 10.

The steering tube 20 is hollow and receives a horn relay wire 36 which is connected at one end by an electrical connection, not shown, to a horn travel plate 38 carried by the steering wheel. The horn travel plate 38 has three or more circumferentially spaced embossments 40 by means of which it engages a washer-type spring 42 of a slight conical shape. The steering wheel spokes 12 have the characteristics of an insulator, being formed of a rubber, synthetic resin, or other plastic material. The conical spring 42 is seated at various points about its periphery on one or more shoulders 44 presented by the insulative material of the spokes 12 and at one or more shoulders 46 provided by the insulators 34.

A washer-like ground plate 48 is seated in the top of the steering wheel hub 14 so as to be effectively grounded thereby to the chassis of the vehicle through the steering tube 20 and the steering column. Depression of the travel plate 38, to which the horn relay wire 36 is connected, causes the resistance of the conical spring 42 to be overcome such that the inner periphery of the conical spring 42 makes an electrical contact with the ground plate 48 thus forming a ground circuit for the horn relay wire 36. The travel plate 38 has a disc of insulator backing 50 on the upper side thereof.

A horn ring 52 is mounted to the steering wheel 10 in a manner hereinafter set forth in detail such that the horn ring 52 may have, against the yieldable opposition of the conical spring 42, a limited tilting movement with respect to the plane of the steering wheel 10. Thus, the horn ring 52 is provided with a set of three spokes 54 extending radially inwardly to a common horn ring hub 56. Three or more downwardly offset feet 58 are carried by the horn ring hub 56 and are apertured to receive a like number of insulated studs 60 such as to engage the undersides of the upper ends of the latter. Each stud 60 associated with a corresponding foot 58 is screwed securely in place to the steering wheel hub 14 by means of a threaded fastener 62. Each foot 58 has a path of limited axial movement along its corresponding insulated stud 60 from an upper limiting position where the foot engages the underside of the stud 60 to another limiting position assumed at a time when the inner periphery of the conical spring 42 engages the ground plate 48. The horn ring hub 56 is provided with a central recess 64 having an inwardly directed flange means 66 at the inside of the bottom thereof. The flange means 66 forms a relatively narrow ledge about the inside of the hub opening 64 and defines a general central opening 68 at the extreme inner ends of the flange means. A flat spring 70 seats on the ledge formed by the flange means 66 and includes a plurality of inwardly extending spring fingers 72 which terminate at their inner ends along what is equivalent to a general circular path of revolution indicated at 74. The free position of the spring fingers 72 is indicated by the dotted showing at 72'. A short shank 76 forming part of a ring element 78 is received within the aforesaid circular path of revolution 74 such that the spring fingers in their deflected full line position 72 engage a shoulder of the ring element 78 and resiliently support it within the central recess of the horn ring hub 56. The ring element 78 may be seen from the views to a general annular construction and is formed of a deformable material such as rubber, plastic, or other elastomer. In the actual physical construction of illustrated embodiment of the invention, the ring element 78 is made from natural rubber having a durometer reading of 60 hardness units and the qualities thereof have proved very satisfactory for the present purpose. The free form assumed by the element 78 is indicated at 78'.

A transparent plastic piece 80 is provided which may be composed of a clear synthetic resin or a natural resin, for instance. The underside 82 of the piece 80 is formed with a depressed intaglio-like design which when viewed through the clear upper side of the transparent element 80 gives the appearance of a metal embossment. To such end, the underside 82 is by a well known process selectively covered with coatings giving the appearance of different colors such as to present an attractive colored display in the embossment-like representation. Various colored pigments may be applied for the purpose of coating the underside 82, but in its preferable form, the coating is of a metallic or metallic-like composition to give luster to the surface of the embossment. It has been found, for instance, that when the under surface is exposed to gold vapor or to the vapor of silver or other precious metals, the gold effect or other effect as appropriate, may be created with only a very thin deposit of a minute quantity of the precious metal. Certain base metals are found suitable for this same purpose, aluminum being one example thereof. One physical construction of the ornament 80 made according to the illustrated embodiment 82 of Figure 2, had a band 84 therefor made from a deposit of gold vapor, and also the outline of a seal 86 was of gold, and a set of indicia 88 was of gold. The background 90 for the indicia 88 was made of black pigment or a metal giving a black appearance, and a field 92 for the seal 86 was, in the physical construction under consideration, so coated as to appear red.

A bezel 94 is provided for the hub cover ornament 80 and has an inturned upper flange engaging the ornament 80 and three or more depending members 96. The members 96 will be noted to be considerably radially offset with respect to the inner ends of said spring fingers 72. The flange 66 is provided with sets of slots corresponding in number to the depending members 96 with each set of slots including a long and a short slot 98, 100 respectively, separated by an unrelieved flange strip 99 and being circumferentially aligned with the slots of every other set of slots. Each of the depending members 96 is of a general J shape having a base 102 which interconnects the relatively shorter leg 104 to the relatively longer leg of the J. The length of the base 102 is short so as to make the lower end of the J-shaped depending member 96 small enough to be received through the corresponding long slot 98 of the set. When the ornament 80 and the bezel 94 are inserted in the hub recess 64 and the depending members 96 are caused to enter through the long slots 98 to a point where the short leg 104 has some clearance below the flange strip 99, clockwise rotation of the ornament and the bezel 94 will cause the members 96 carried by the latter to be rotated clockwise so as to permit each of the short legs 104 to register with a corresponding short slot 100 so as to enter it from below. Thereafter the ornament 80 can be released and under urgings of the spring fingers 72, the base 102 of the J-shaped member will be caused to engage the strip 99 to hold the bezel 94 in place. The hub cover ornament 80 is held firmly within the bezel 94 due to the action of the spring-pressed ring element 78 which yieldably deforms from the dotted position 78' to the full line position 78 to assume and complement the intaglio-like contour on the underside of the ornament 80. The J-shaped depending members 96 are held under tension due to the action of the axially deflected spring fingers 72 which maintain a tight, compact assembly particularly free from rattles. Removal of the ornament 80 is accomplished in two steps, first when the ornament 80 is depressed slightly such as to cause the short leg 104 of the bezel depending members 96 to be retracted downwardly from the short slot 100. Thereafter the bezel 94 can be rotated counterclockwise to a position where the long and short legs of the depending member 96 both register with the long slot 98 and can be withdrawn upwardly therethrough so as to release the flat spring 70.

As herein disclosed, the invention is shown utilized in an ornament supporting fastener construction arranged to have clockwise rotation for fastening and a counterwise rotation for unfastening. It is evident however, that the fastening can be equally well accomplished on counterclockwise rotation merely by interchange in the flange of the long and short slots one for the other and by correspondingly interchanging the long and short legs of the depending J-shaped members. So also the drawing shows a horn ring which is non-circular in certain portions of its outer periphery, but the horn ring is equally effective when of completely circular configuration. The medallion 80 is used as a steering wheel hub cover ornament according to the embodiment selected for illustration, but self-evidently the medallion and fastener-supporting means can be used broadly to cover and decorate various hubs and recesses which are desirably ornamented.

Variations within the spirit and scope of the described invention are equally comprehended by the foregoing description.

What is claimed is:

1. In a horn ring adapted to be carried by a steering wheel so as to have limited tilting movement with respect to the plane of the latter, a hub having a central recess, inwardly extending flange means at the bottom of the recess and defining a central opening within said central recess, and a plurality of sets of long and short slots in said flange means penetrating therethrough and being in circumferential alignment, an element seated on said flange means having spring finger means extending generally radially inwardly within said central recess, an annulus of a yieldable non-metallic member supported by said spring finger means, and a transparent hub cover ornament assembly including an ornament having a bezel provided with a plurality of parallel J-shaped depending members each arranged for lockably interfitting with one of said sets of long and short slots with the short leg of the member received in the short slot and the long leg of the member in the long slot, said cover ornament having a coated intaglio design in the underside thereof and being disengageably engageable with said yieldable annulus in locked position of the bezel in a manner such that when said ornament assembly is slightly depressed and rotated with respect to said horn ring central recess so as to cause the long and short legs of each J-shaped member thereof to register with the long slot only of the corresponding set of slots, the ornament assembly is axially movable so as to separate said ornament from said annulus.

2. In a horn ring adapted to be carried by a steering wheel so as to have limited tilting movement with respect to the plane of the latter, a hub having a central recess, inwardly extending flange means at the bottom of the recess and defining a central opening inwardly thereof, and a plurality of sets of long and short slots in said flange means penetrating therethrough and being in circumferential alignment with respect to one another, a circular spring element seated in said central recess on said flange means and having deflectable spring finger means extending generally radially inwardly within said central recess, a ring of soft rubber received on and deflectably supported by the tips of said deflectable spring finger means, a hub cover assembly including a transparent ornament having a retaining bezel provided with a plurality of depending J-shaped members, said transparent ornament having a coated intaglio design in the underside thereof and being held disengageably engaged with the deflectably supported rubber ring when the hub cover assembly is arranged in said recess with the long and short legs of each J-shaped member disposed respectively in a long and short slot of a corresponding set of said plurality of sets of slots.

3. A horn ring for a steering wheel and of the type carried thereby so as to be slightly tiltable with respect to the plane of the latter, said horn ring having a hub provided with a hub opening and an internal apertured ledge therein, a member seated on said ledge having spring finger means extending radially inwardly and disposed with their tips in circularly arranged spaced proximity, a hub cover assembly comprising a transparent ornament having a bezel provided with depending J-shaped members receivable in said ledge apertures so as to retain said assembly relative to said horn ring hub, said transparent ornament having a coated intaglio design in the underside thereof, and a readily deformable annulus received on the tips of said spring finger means and engageable with the underside of said transparent ornament so as to apply pressure to the hub cover assembly through direct contact with said coated intaglio design.

4. A horn ring for a steering wheel and of the type carried thereby so as to be slightly tiltable with respect to the plane of the latter, said horn ring having a hub provided with a hub opening and an internal apertured ledge therein, a member seated on said ledge having spring finger means extending radially inwardly and disposed with their tips in circularly arranged spaced proximity, a hub cover assembly comprising a transparent ornament having a bezel provided with depending J-shaped members receivable in said ledge apertures so as to retain said assembly relative to said horn ring hub, said transparent ornament having a depressed area on the underside thereof and covered with material including a precious metal, and a soft rubber ring received on the tips of said spring finger means and yieldably engageable with the underside of said transparent ornament so as to apply pressure to the hub cover assembly through direct contact with said depressed area.

References Cited in the file of this patent

UNITED STATES PATENTS

| | | |
|---|---|---|
| 1,051,805 | Danberg | Jan. 28, 1913 |
| 1,319,893 | Mueller | Oct. 28, 1919 |
| 1,477,785 | Szulkalski | Dec. 18, 1923 |
| 1,538,320 | Gullong | May 19, 1925 |
| 1,832,364 | Dover | Nov. 17, 1931 |
| 1,906,504 | Allison | May 2, 1933 |
| 2,202,116 | Mosley | May 28, 1940 |
| 2,454,242 | Wharam | Nov. 16, 1948 |
| 2,455,204 | Wharam et al. | Nov. 30, 1948 |
| 2,516,771 | Herscher | July 25, 1950 |

FOREIGN PATENTS

| | | |
|---|---|---|
| 951,297 | France | Apr. 11, 1949 |